(No Model.)
L. BEARD.
CLOTHES BASKET PROTECTOR.
No. 486,527. Patented Nov. 22, 1892.
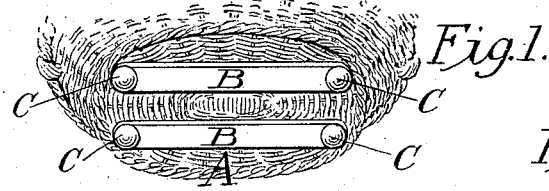
Fig. 1.
Fig. 6.
Fig. 4.
Fig. 2.
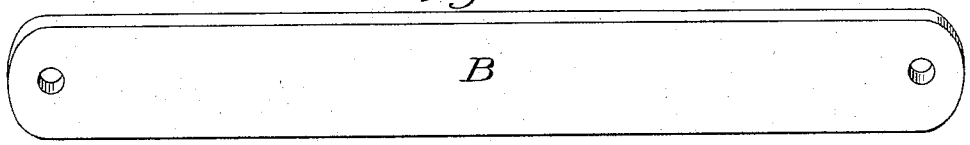
Fig. 7.
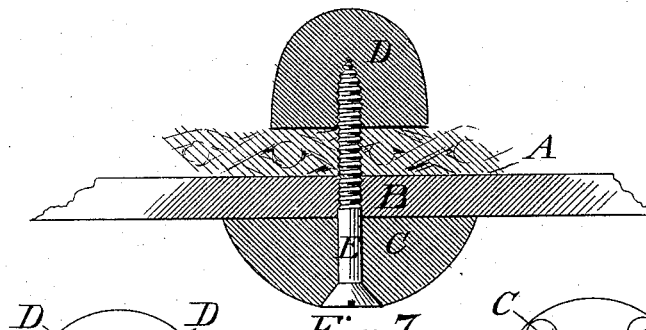
Fig. 5.
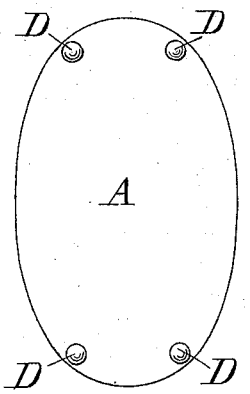
Fig. 3.
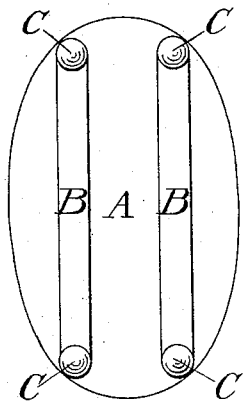
Witnesses.
Estella Shinault
Adelia B. Beard
Inventor:
Lina Beard

UNITED STATES PATENT OFFICE.

LINA BEARD, OF FLUSHING, NEW YORK.

CLOTHES-BASKET PROTECTOR.

SPECIFICATION forming part of Letters Patent No. 486,527, dated November 22, 1892.

Application filed August 18, 1891. Serial No. 403,062. (No model.)

*To all whom it may concern:*

Be it known that I, LINA BEARD, a citizen of the United States, residing at Flushing, in the county of Queens, Long Island, and State of New York, have invented a new, useful, and original Protector for Clothes-Baskets, of which the following is a specification.

My invention relates to protectors for clothes-baskets; and the objects of my protector are, first, to afford facilities for the proper elevation of the clothes-basket from the floor; second, to protect the bottom of the clothes-basket without adding perceptibly to its weight; third, to provide for and insure the safety of the clothes placed in the basket from liability to injury in any form from contact with the protector, and, fourth, to have the protector made in such a manner that it may be either permanent or adjustable, thus enabling any one to attach the protector to old as well as new baskets. I attain these objects by the apparatus illustrated in the accompanying drawings, in which—

Figure 1 is a clothes-basket, showing the under side of the protector; Fig. 2, the bar; Fig. 3, the outside of the bottom of the basket, with buttons and bars attached; Fig. 4, the button; Fig. 5, the inside of the bottom with the thimble in place; Fig. 6, the thimble; Fig. 7, a vertical section of the protector.

Similar letters refer to similar parts throughout the several views.

Clothes-baskets used for laundry-work are subjected to rough and destructive treatment, and unless they are properly protected and prevented from scraping and rubbing over the floors and ground they very soon break and wear away. The surface of the basket being uneven, when it is dragged over rough floors or ground the basket is battered and partially destroyed, so that in a short time it becomes valueless, the bottom being rendered useless before the sides show any signs of wear.

To protect the basket and carry my invention into effect, I use strong buttons and thimbles made of hard wood in connection with wooden bars.

The basket A, Fig. 1, rests on bars B B, made of strong smooth hard wood, with the sharpness of the edges scraped and smoothed off, except at the ends where the buttons rest. The bars are made long enough to extend lengthwise across the bottom of the clothes-basket from handle to handle. They are rounded at each end, and holes to admit of screws passing through are in each end. (See Fig. 2.) Fitting exactly and screwed tightly on the extreme ends of the bars are hard-wood buttons C C C C, Fig. 3, with a hole made through the center of each for the passage of the screw and a depression cut on the bottom of the button, Fig. 4, in which fits and rests the head of the screw, rendering the outward surface of the button after the screw is countersunk smooth and even. On the bottom of the inside of the basket A, Fig. 5, are the four hard-wood thimbles D D D D, which fit tightly over the four projecting points of the screws used in fastening on the buttons C C C C and the bars B B. Each of these thimbles has a hole partially through its center, but only extending far enough to admit and fit the point of the screw, Fig. 6. These thimbles preclude all liability of the clothes being torn or in any way injured. They are perfectly smooth, so the clothes cannot catch on them, and as they completely cover the points of the screws there is no danger of rust.

I show in Fig. 7, which is a vertical section of the protector, exactly how the protector is fastened on the basket. The screw E passes first through the button C, on which the whole structure rests. Then the screw pushes on through the bar B, next through the basket A, and up into the thimble D, where it rests perfectly tight and secure.

I use four screws, four buttons, four thimbles, and two bars for each basket.

I am aware that prior to my invention bars running lengthwise across the under side of the bottom of a basket have been used; but I am not aware that they have been used in connection with the hard-wood thimbles and buttons. These latter are entirely my own invention.

What I claim as my invention, and desire to secure by Letters Patent, is—

The combination, with a clothes-basket, of a protector consisting of two bars B B, the projecting buttons C, near the ends of each bar, and the thimbles D, covering the points of the screws passing through the buttons and bottom of the basket, substantially as described.

LINA BEARD.

Witnesses:
SADIE A. SMITH,
ADELIA B. BEARD,
JAMES S. SMITH.